US007480631B1

(12) United States Patent
Merced et al.

(10) Patent No.: US 7,480,631 B1
(45) Date of Patent: Jan. 20, 2009

(54) SYSTEM AND METHOD FOR DETECTING AND PROCESSING FRAUD AND CREDIT ABUSE

(75) Inventors: Angel Merced, Wilmington, DE (US); Timothy A. Webb, Elkton, MD (US); SueAnne Senz, Boothwyn, PA (US); Chakravarthi S. Bathula, Newark, DE (US); Lou Ann Hoffman, Hockessin, DE (US); Anthony E. Rita, West Grove, PA (US); Kevin D. Buckner, Wyncote, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 935 days.

(21) Appl. No.: 11/011,685

(22) Filed: Dec. 15, 2004

(51) Int. Cl.
G06Q 40/00 (2006.01)
H04K 1/00 (2006.01)
H04L 9/00 (2006.01)

(52) U.S. Cl. .................... 705/35; 705/67; 235/380

(58) Field of Classification Search .......... 379/91.01, 379/93.12, 114.14, 144.03, 145; 705/35, 705/38, 67, 75; 235/380; 382/115, 139
See application file for complete search history.

(56) References Cited

U.S. PATENT DOCUMENTS

| 3,634,669 A | 1/1972 | Soumas et al. |
| 4,254,474 A | 3/1981 | Cooper et al. |
| 4,346,442 A | 8/1982 | Musmanno |
| 4,355,372 A | 10/1982 | Johnson et al. |
| 4,376,978 A | 3/1983 | Musmanno |
| 4,597,046 A | 6/1986 | Musmanno et al. |
| 4,598,367 A | 7/1986 | DeFrancesco et al. |
| 4,642,768 A | 2/1987 | Roberts |
| 4,674,044 A | 6/1987 | Kalmus et al. |
| 4,736,294 A | 4/1988 | Gill et al. |
| 4,739,478 A | 4/1988 | Roberts et al. |
| 4,760,604 A | 7/1988 | Cooper |
| 4,774,663 A | 9/1988 | Musmanno et al. |
| 4,831,526 A | 5/1989 | Luchs |
| 4,866,634 A | 9/1989 | Reboh |
| 4,897,811 A | 1/1990 | Scofield |

(Continued)

OTHER PUBLICATIONS

Roger et al., A credit scoring model to evaluate the credit worthiness of credit card applicants, Developments in Marketing Science, vol. 5, 1982, 2 pages.

(Continued)

*Primary Examiner*—Binh K Tieu
(74) *Attorney, Agent, or Firm*—Hunton & Williams, LLP (57) ABSTRACT

A system and method for detecting and processing fraud and credit abuse is disclosed. One embodiment of the present invention comprises a method for detecting and processing fraud and credit abuse. The method may comprise: receiving a telephone call from a caller concerning a credit account; identifying one or more potential fraud-related problems by searching the credit account data for conditions that match one or more predetermined qualifiers and quantifiers; presenting the caller with a series of questions and soliciting, from the caller, responses to the series of questions, wherein each question in the series is generated based on the one or more potential fraud-related problems and further based on the caller's responses to earlier questions in the series; and determining a fraud status associated with the credit account based on a computerized analysis of the solicited responses.

29 Claims, 8 Drawing Sheets

U.S. PATENT DOCUMENTS

| | | | |
|---|---|---|---|
| 4,972,504 | A | 11/1990 | Daniel, Jr. |
| 5,041,972 | A | 8/1991 | Frost |
| 5,220,500 | A | 6/1993 | Baird |
| 5,227,874 | A | 7/1993 | Von Kohorn |
| 5,231,571 | A | 7/1993 | D'Agostino |
| 5,278,751 | A | 1/1994 | Adiano |
| 5,297,032 | A | 3/1994 | Trojan et al. |
| 5,444,844 | A | 8/1995 | Inoue |
| 5,481,647 | A | 1/1996 | Brody |
| 5,490,060 | A | 2/1996 | Malec |
| 5,523,942 | A | 6/1996 | Tyler |
| 5,550,734 | A | 8/1996 | Tater |
| 5,551,021 | A | 8/1996 | Harada |
| 5,583,778 | A | 12/1996 | Wind |
| 5,592,590 | A | 1/1997 | Jolly |
| 5,603,025 | A | 2/1997 | Tabb |
| 5,606,496 | A | 2/1997 | D'Agostino |
| 5,611,052 | A | 3/1997 | Dykstra |
| 5,615,109 | A | 3/1997 | Eder |
| 5,615,341 | A | 3/1997 | Agrawal et al. |
| 5,649,116 | A | 7/1997 | McCoy |
| 5,655,085 | A | 8/1997 | Ryan |
| 5,671,363 | A | 9/1997 | Cristofich et al. |
| 5,689,650 | A | 11/1997 | McClelland et al. |
| 5,717,865 | A | 2/1998 | Stratmann |
| 5,732,397 | A | 3/1998 | DeTore |
| 5,758,328 | A | 5/1998 | Giovannoli |
| 5,765,144 | A | 6/1998 | Larche |
| 5,774,878 | A | 6/1998 | Marshall |
| 5,774,883 | A | 6/1998 | Andersen |
| 5,802,502 | A | 9/1998 | Gell |
| 5,842,178 | A | 11/1998 | Giovannoli |
| 5,852,811 | A | 12/1998 | Atkins |
| 5,870,721 | A | 2/1999 | Norris |
| 5,873,096 | A | 2/1999 | Lim |
| 5,875,437 | A | 2/1999 | Atkins |
| 5,878,258 | A | 3/1999 | Pizi et al. |
| 5,878,403 | A | 3/1999 | DeFrancesco et al. |
| 5,913,202 | A | 6/1999 | Motoyama |
| 5,918,217 | A | 6/1999 | Maggioncalda |
| 5,920,848 | A | 7/1999 | Schutzer |
| 5,930,775 | A | 7/1999 | MacCauley |
| 5,940,811 | A | 8/1999 | Norris |
| 5,940,812 | A | 8/1999 | Tengel |
| 5,950,175 | A | 9/1999 | Austin |
| 5,963,953 | A | 10/1999 | Cram |
| 5,970,467 | A | 10/1999 | Alavi |
| 5,974,396 | A | 10/1999 | Anderson |
| 5,978,779 | A | 11/1999 | Stein et al. |
| 5,983,206 | A | 11/1999 | Oppenheimer |
| 5,987,434 | A | 11/1999 | Libman |
| 5,995,942 | A | 11/1999 | Smith |
| 5,999,907 | A | 12/1999 | Donner |
| 6,009,415 | A | 12/1999 | Shurling et al. |
| 6,018,722 | A | 1/2000 | Ray et al. |
| 6,021,397 | A | 2/2000 | Jones et al. |
| 6,026,370 | A | 2/2000 | Jermyn |
| 6,029,139 | A | 2/2000 | Cunningham |
| 6,032,125 | A | 2/2000 | Ando |
| 6,044,371 | A | 3/2000 | Person et al. |
| 6,055,510 | A | 4/2000 | Henrick |
| 6,070,147 | A | 5/2000 | Harms |
| 6,076,072 | A | 6/2000 | Libman |
| 6,078,892 | A | 6/2000 | Anderson |
| 6,088,686 | A | 7/2000 | Walker et al. |
| 6,108,641 | A | 8/2000 | Kenna et al. |
| 6,173,270 | B1 | 1/2001 | Cristofich et al. |
| 6,188,993 | B1 | 2/2001 | Eng et al. |
| 6,199,077 | B1 | 3/2001 | Inala et al. |
| 6,202,053 | B1 | 3/2001 | Christiansen et al. |
| 6,236,978 | B1 | 5/2001 | Tuzhilin et al. |
| 6,249,775 | B1 | 6/2001 | Freeman et al. |
| 6,269,346 | B1 | 7/2001 | Cristofich et al. |
| 6,321,212 | B1 | 11/2001 | Lange |
| 6,502,080 | B1 | 12/2002 | Eichorst et al. |
| 6,658,393 | B1 * | 12/2003 | Basch et al. ............... 705/38 |
| 2003/0050882 | A1 * | 3/2003 | Degen et al. ............... 705/35 |
| 2003/0187783 | A1 * | 10/2003 | Arthus et al. ............... 705/39 |
| 2003/0216965 | A1 | 11/2003 | Libman |
| 2004/0030626 | A1 | 2/2004 | Libman |
| 2004/0093218 | A1 * | 5/2004 | Bezar ....................... 704/273 |

OTHER PUBLICATIONS

Pourmokhtar, A hedge fund primer version 0.1, www.emf.net, printed Jul. 24, 2002, 5 pages.

Taylor et al., Card issuers turn to scoring as they face increasing risk, Financial Services Report, vol. 8, No. 15, 1 page, Jul. 24, 1991, 3 pages.

Friedland, Credit scoring digs deeper into data, Credit World, vol. 84, No. 5, pp. 19-23, May 1996, 3 pages.

Trading and Capital-Markets Activities Manual, Instrument Profiles: Structured Notes, www.toerien.com, printed Jul. 24, 2002, 14 pages.

Dodd, Primer: Derivatives Instruments, Derivatives Study Center, www.econstrat.org, printed Jul. 24, 2002, 8 pages.

Huddling with William Bernstein: Small Town Doctor, Investing Pro, 3 pages (Author, Source & Date Unknown).

Henry Kneis, Hedge Fund Strategies: A Primer, canadianhedgewatch, 1 page (Author & Date Unknown).

Hedge Fund Primer: About Fund of Funds, www.hedgefund.net, printed Jul. 24, 2002, 2 pages.

Hedge Fund Primer, Online Education About Hedge Funds, The Basics, www.kspcapital.com, printed Jul. 24, 2002, 18 pages.

Armstrong, Fund of Funds: Perfect Solution or Dangerous Shortcut?, Investor Solutions, Inc., www.investorsolutions.com, printed Jul. 24, 2002, 3 pages.

Wall Street Journal Nov. 7, 2002, Fidelity Helps Fund Sellers Trim the Taxes They'll Owe, 2 pages.

Hickman, Using Software To Soften Big-Time Competition, Bank Systems Technology, vol. 31, No. 8, pp. 38-40, Jun. 1994, (2 pages).

Portner, There Must Be A Better Way, Mortgage Banking, vol. 5, No. 2, pp. 12-22, Nov. 1992, 8 pages.

Carey, The Sub-Prime Credit Market: Identifying Good Risks for Unsecured Cards, Credit World, vol. 85, No. 1, pp. 13-15, Sep. 1996, 4 pages.

Sullivan, Scoring borrower risk, Mortgage Banking, vol. 55, No. 2, pp. 94-98, Nov. 1994, 6 pages.

Opportunity Knocks at Scoring's Door (Trends and developments in scoring technology examined; scoring now is used for eveything from prescreening credit card applicants to debt collections), Collections & Credit Risk, vol. 2, No. 4, pp. 53+, Apr. 1997, 6 pages.

Makuch et al., Managing Consumer Credit Delinquency in the S Economy: A Multi-Billion Dollar Management Science Application, Interfaces 22: 1, Jan.-Feb. 1992, pp. 90-109, 8 pages.

Asch, How the RMA/Fair, Isaac credit-scoring model was built, Journal of Commercial Lending, vol. 77, No. 10, pp. 10-16, Jun. 1995, 6 pages.

Jameson, Expanding Risk Management Strategies: Key to Future Survival, Credit World, vol. 84, No. 5, pp. 16-18, May 1996, 3 pages.

Quinn, Credit Card Issuers Keeping a Closer Watch on How You Pay Bills, Washington Post, Staying Ahead, Apr. 25, 1988, Business Section P6, 1 page.

Credit scoring new markets, Bank Technology News, vol. 9, No. 7, Jul. 1996, 5 pages.

Ceiba, Derivatives primer, Committee on Investment of Employee Benefit Assets, Association for Financial Profesionals, 11 pages.

Why a Fund of Funds, www.managedinvestments.com, printed Jul. 24, 2002, 2 pages.

Bogle, Mutual funds at the millennium: Fund directors and fund myths, New York, May 15, 2000, 15 pages.

* cited by examiner

SYSTEM AND METHOD FOR DETECTING AND PROCESSING FRAUD AND CREDIT ABUSE

FIELD OF THE INVENTION

The present invention relates generally to banking and financial services. More particularly, the present invention relates to a system and method for detecting and processing fraud and credit abuse.

BACKGROUND OF THE INVENTION

A credit card offers great convenience by allowing the cardholder to make cashless purchases and to borrow against a line of credit. Unfortunately, credit cards are also vulnerable to fraud and abuses. As credit card use increases in recent years, fraud and credit abuse cases are on the rise as well. A fraud (or "credit card fraud") occurs when a fraudster misappropriates someone else' credit card or credit information and puts the card or information to unauthorized uses (e.g., fraudulent credit applications or unauthorized purchases). A credit abuse occurs when a legitimate cardholder uses his or her own credit card(s) in an abusive or irresponsible manner (e.g., overspending without an intent to pay off the balance).

Both types of credit misuses can be costly to cardholders as well as card issuers. Cardholders victimized by credit card fraud may face unexpected financial liability and may find their credit ratings damaged. A significant portion of the financial losses due to fraud and credit abuse usually rest on the card issuers. Major card issuers typically have to absorb hundreds of thousands of dollars in fraud losses every month.

A number of solutions have been proposed or implemented to fight fraud and credit abuse. However, the existing solutions are predominantly "manual" processes which require the employment of highly trained fraud analysts. Due to the high volume of potential fraud cases, a large number of fraud analysts are needed to keep up with the processing tasks. The employment and training of the fraud analysts can be too expensive to be justified by the recovered fraud loss. Manual processing of fraud cases is typically unsystematic, which leads to results that are either inconsistent or inaccurate. Manual processing is usually slow in producing fraud judgments. Due to the poor quality and belatedness of manually generated fraud judgments, the card issuer often miss valuable opportunities to defeat ongoing misuses (e.g., by timely disapproving fraudulent charges) or to shift the fraud losses (e.g., by exercising charge-back against retailers soon after the fraudulent charges).

Other problems and drawbacks also exist.

In view of the foregoing, it would be desirable to provide a solution for detecting and processing fraud and credit abuse which overcomes the above-described deficiencies and shortcomings.

SUMMARY OF THE INVENTION

One embodiment of the present invention comprises a method for detecting and processing fraud and credit abuse. The method may comprise: receiving a telephone call from a caller concerning a credit account; identifying one or more potential fraud-related problems by searching the credit account data for conditions that match one or more predetermined qualifiers and quantifiers; presenting the caller with a series of questions and soliciting, from the caller, responses to the series of questions, wherein each question in the series is generated based on the one or more potential fraud-related problems and further based on the caller's responses to earlier questions in the series; and determining a fraud status associated with the credit account based on a computerized analysis of the solicited responses.

Another embodiment of the present invention comprises a method for detecting and processing fraud and credit abuse. The method comprises: capturing transaction data associated with a credit account on a substantially real-time basis; evaluating the captured transaction data against a plurality of fraud qualifiers and quantifiers; and generating a fraud alert based on the evaluation, wherein the fraud alert comprises a potential fraud type and a recommended strategy for dealing with the potential fraud type.

Yet another embodiment of the present invention comprises a method for detecting and processing fraud and credit abuse. The method comprises: establishing an interactive communication with a customer concerning a credit account; identifying one or more potential fraud-related problems by searching the credit account data for conditions that match one or more predetermined qualifiers and quantifiers; presenting the customer with a series of questions and soliciting, from the customer, responses to the series of questions, wherein each question in the series is generated based on the one or more potential fraud-related problems and further based on the caller's responses to earlier questions in the series; and determining a fraud status associated with the credit account based on a computerized analysis of the solicited responses.

Additional features and advantages of the invention will be set forth in the description that follows. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements.

DETAILED DESCRIPTION OF THE INVENTION

Reference will now be made in detail to the present embodiments of the invention, examples of which are illustrated in the accompanying drawings.

Figure 1:
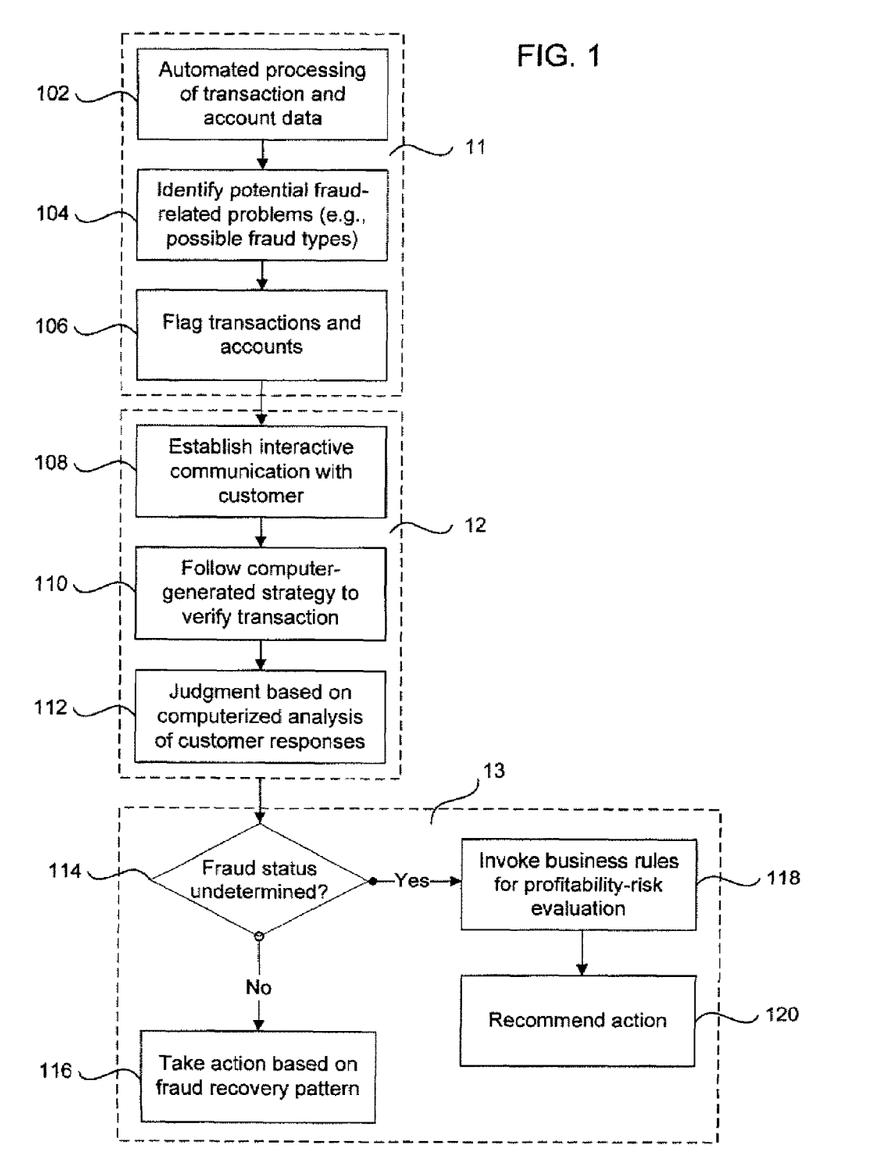
FIG. 1 is a flow chart illustrating an exemplary method for detecting and processing fraud and credit abuse according to an embodiment of the present invention.

Referring to FIG. 1, there is shown a flow chart illustrating an exemplary method for detecting and processing fraud and credit abuse in accordance with an embodiment of the present invention. This exemplary embodiment provides an overview of a systematic approach for the detection, verification, and disposition of fraud and credit abuse.

During the detection phase (11), in step 102, computer intelligence may be employed for automated processing of transaction and account data. The data may be examined for suspicious patterns defined by a set of fraud qualifiers and quantifiers. The automated processing may be carried out on a substantially real-time basis or on a periodic basis. For example, as soon as they are sent in from points of sales (POS's), transaction data may be searched for conditions indicative of fraud or credit abuse. Alternatively, recently captured or updated transaction or account data may be analyzed on an hourly basis, for example. If suspicious patterns are detected, the potentially fraud-related problems may be identified in step 104. Based on the automated processing results, one or more fraud types may be identified. Then, in step 106, the problematic transactions and accounts may be flagged and restrictions may be imposed on these transactions or accounts, if necessary.

During the verification phase (12), in step 108, an interactive communication may be established with a customer who is associated with a problematic transaction or account. The customer may be a person who has been identified as either a potential fraud victim or a potential fraudster. The communication may be initiated by the customer through an inbound telephone call, which is then answered by a fraud analyst. Or the communication may be an outbound telephone call initiated by a fraud analyst on behalf of a card issuer. In step 110, the fraud analyst may follow a computer-generated strategy to verify one or more transactions with the customer. The verification strategy may be generated based on a number of factors, such as a potential fraud type, recent account activities, and account history. Guided by the verification strategy, the fraud analyst may ask the customer a series of questions. The questions may be sequentially generated, each question depending on the customer's responses to the previous ones. Then, in step 112, the customer's responses may be submitted for a computerized analysis, on the outcome of which a judgment may be made regarding a fraud status of the transaction or account in question.

During the disposition phase (13), actions may be taken based on the fraud status determined in the verification phase (12). In step 114, it may be asked whether the fraud status is undetermined. If the verification result has definitively confirmed the existence or non-existence of a fraud or credit abuse, the fraud status is not undetermined. Then, in step 116, actions may be taken according to the determined fraud status. If there is no fraud or credit abuse, restrictions may be removed from the flagged transaction or account. If there is a fraud or credit abuse, a fraud recovery pattern may be followed to end the misuse and seek recovery. However, if the fraud status turns out to be undetermined, then, in step 118, a set of business rules may be invoked for a profitability-risk evaluation of the problematic account. Based on this evaluation, an action may be recommended for a balanced disposition of the account.

The detection, verification, and disposition phases described above may be coordinated and streamlined by computer intelligence. As a result, a significant portion of the traditionally manual process may be taken out of fraud analysts' hands, thereby improving timeliness, accuracy and consistency of fraud resolution results. Also, with the employment of computer intelligence, a same amount of work may require fewer fraud analysts of whom a lower level of training or experience may be required.

Figure 2:
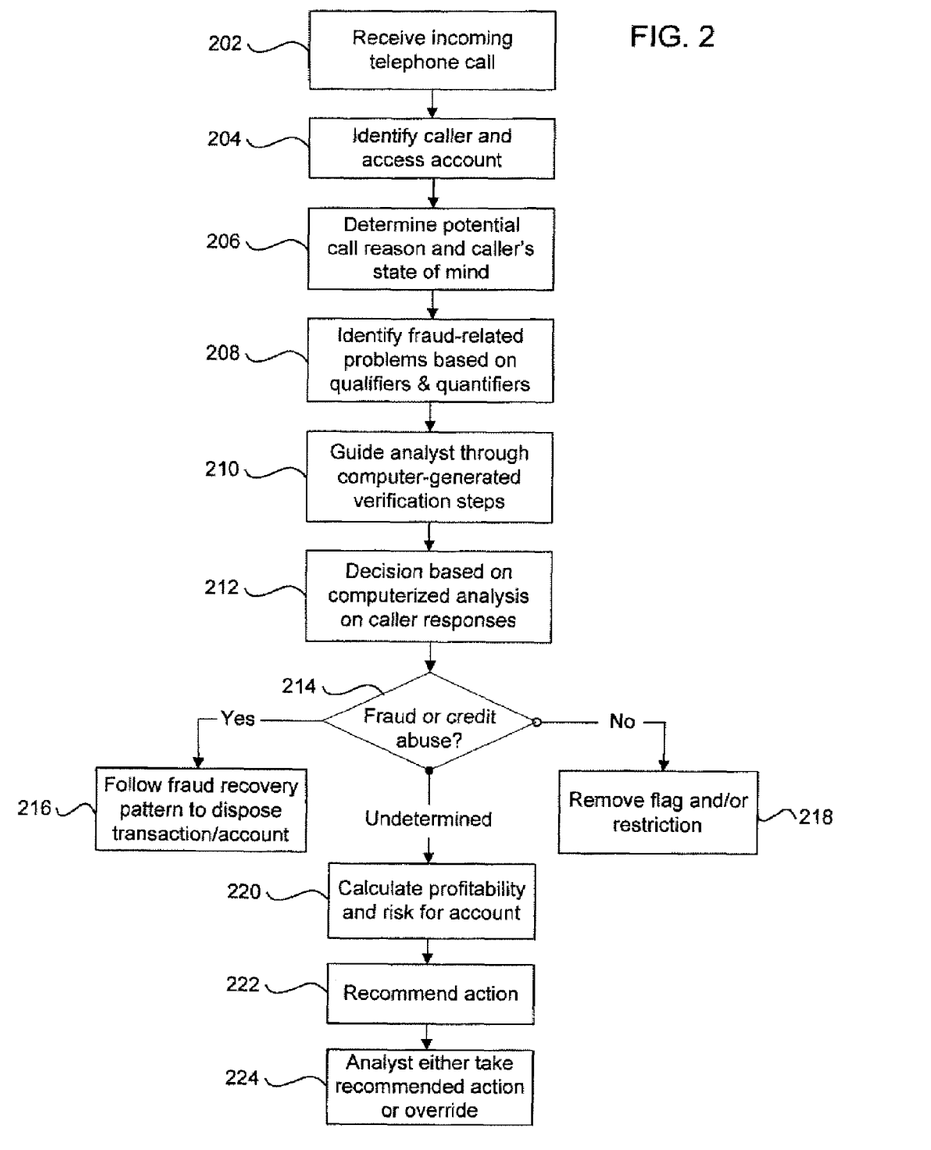
FIG. 2 is a flow chart illustrating another exemplary method for detecting and processing fraud and credit abuse in accordance with an embodiment of the present invention.
Figure 3:
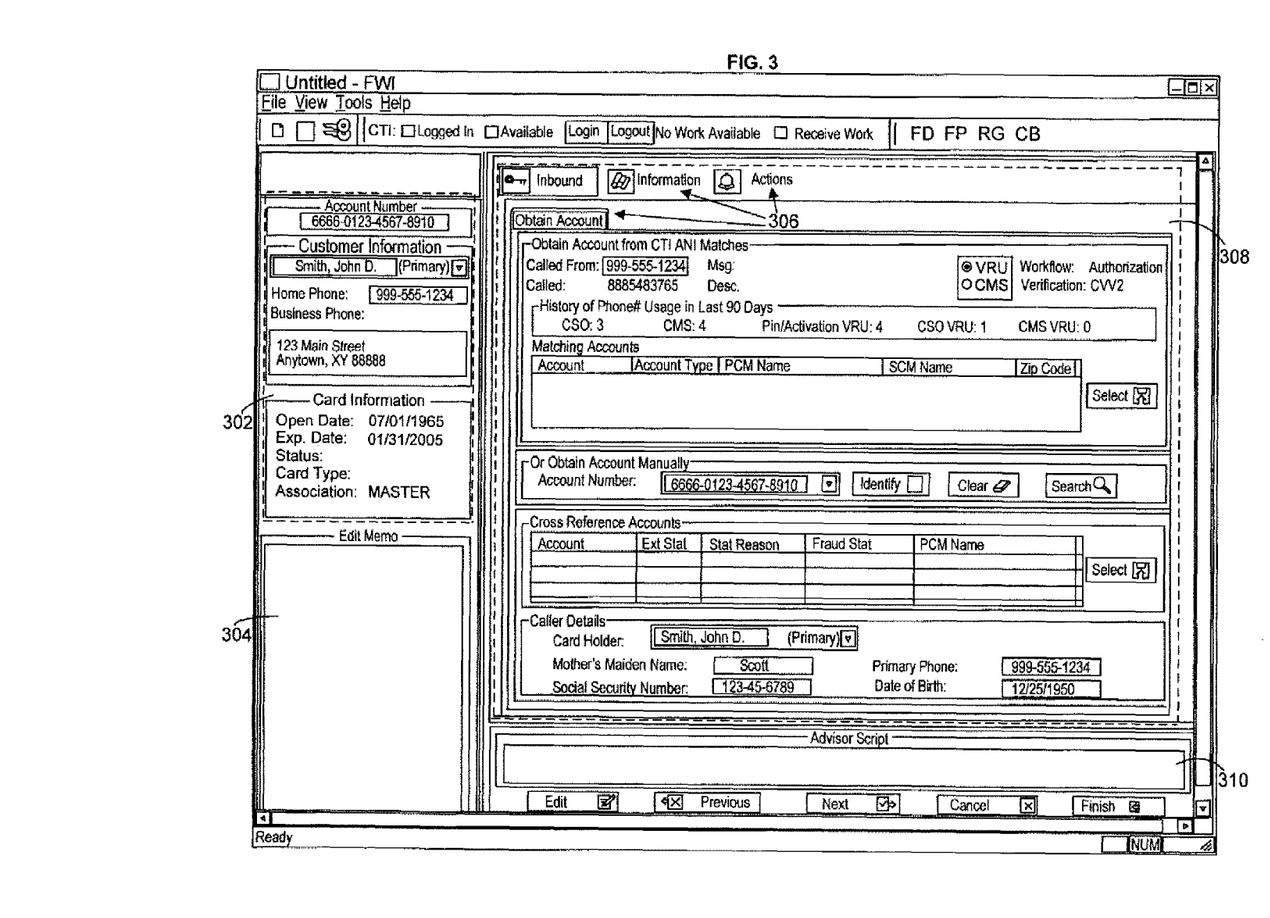
FIG. 3 is an exemplary screen shot of a user interface for accessing a credit card account in accordance with an embodiment of the present invention.
Figure 4:
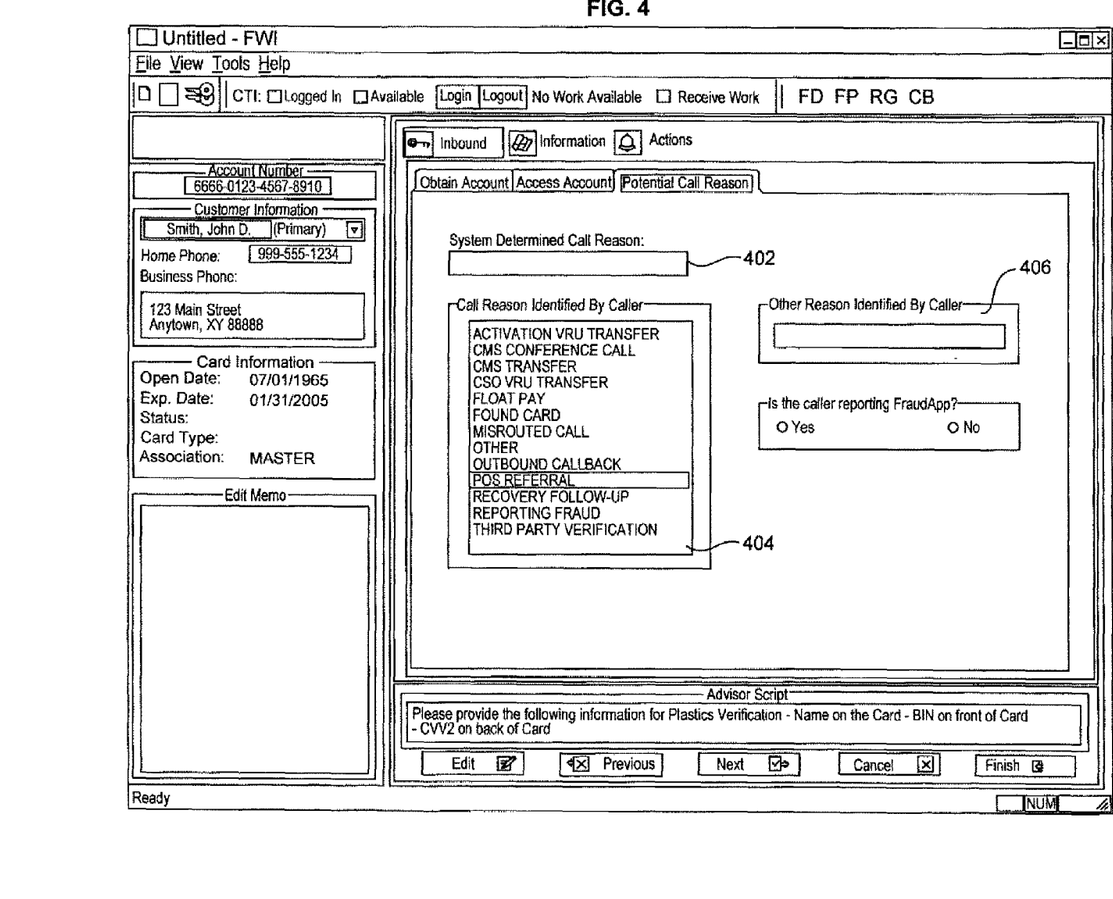
FIG. 4 is an exemplary screen shot of a user interface for displaying a call reason for an incoming call in accordance with an embodiment of the present invention.
Figure 5:
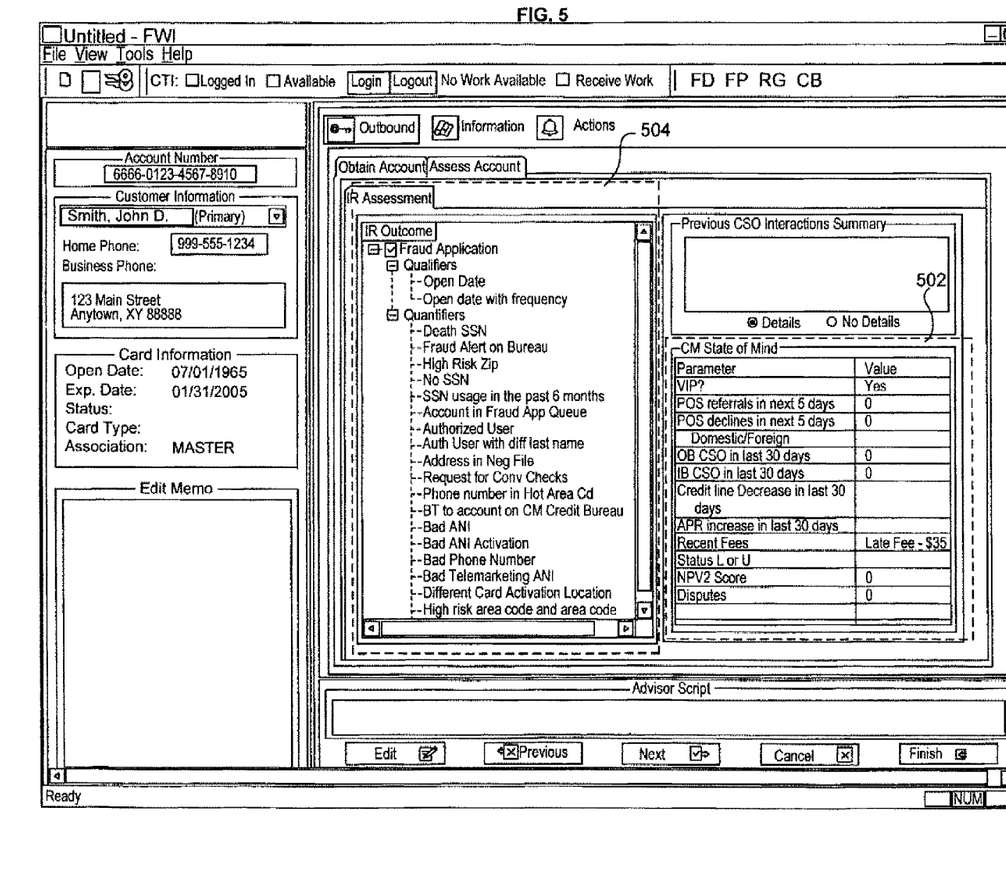
FIG. 5 is an exemplary screen shot of a user interface for displaying a caller's state of mind in accordance with an embodiment of the present invention.

Referring to FIG. 2, there is shown a flow chart illustrating another exemplary method for detecting and processing fraud and credit abuse in accordance with an embodiment of the present invention. A computer program may be implemented to facilitate the exemplary method steps. FIGS. 3-5 show exemplary user interfaces of this computer program according to one embodiment.

In one exemplary scenario, an inbound telephone call may be received at a card issuer's customer service call center in step 202. The caller may be a cardholder or a third party (e.g., merchant at point of sales). For illustration purposes, the following description will assume the caller is a cardholder. The caller may be first greeted by an interactive voice response unit (VRU).

In step 204, the call center computer system may identify the caller and the related account based on his or her inputs to the VRU. If the caller indicates a desire to speak to a fraud analyst or if his or her account has been flagged for a potentially fraud-related problem, for example, it may be determined that the call deserves attention of a fraud analyst. The call may then be routed to a fraud analyst who can access the account in question.

FIG. 3 is an exemplary screen shot of the user interface for accessing a credit card account. As shown, the user interface window may display a variety of information. For example, on the left side, in area 302, there may be displayed the account information and customer information. There may be an "Edit Memo" field 304 where the analyst may create and edit a memorandum concerning a fraud case. On the right side, information may be displayed in area 308 under different tabs 306. The tabs 306 may be used to call up workflows to be executed in fraud detection and processing. Output information corresponding to a current workflow may be displayed in the area 308, and inputs may be made in the same area. Further, computer-generated action items may be displayed in the area 308, and instructions or scripts for the fraud analyst may be displayed in area 310. In the user interface for accessing a credit card account, the cardholder's detailed information is displayed in the area 308.

Referring back to FIG. 2, in step 206, a potential reason for the call as well as the caller's state of mind may be automatically determined. It may be desirable to know the call reason and the caller's state of mind since such information may assist in subsequent fraud verification processes. The caller's VRU inputs and most recent account activities may be analyzed so that a potential reason for this call may be suggested and displayed to the fraud analyst via the computer interface. And the fraud analyst may verify the computer-determined call reason with the caller. FIG. 4 is an exemplary screen shot of the user interface for displaying a call reason for the incoming call. In area 402, there may be displayed a "System Determined Call Reason." In areas 404 and 406, a call reason confirmed by the caller may be selected or described. In addition to the call reason, the system may generate an estimate of the caller's state of mind. A number of factors may affect the caller's state of mind, including recent declines or referrals at points of sales, recent changes in credit line and annual percentage rate (APR), and late fee charges, for example. In FIG. 5, there is shown an exemplary screen shot of the user interface for displaying the card member's state of mind. Specifically, area 502 lists a number of parameters and corresponding values that may be relevant to determine the caller's state of mind.

In step 208, one or more fraud-related problems may be identified. The computer program may search a number of data sources for conditions that match a set of fraud qualifiers and quantifiers. According to one embodiment of the invention, the system may distinguish at least the following fraud types: fraudulent application, account takeover (ATO), non-receipt of credit cards or convenience checks, counterfeiting of credit cards or convenience checks, fraudulent use of an account number via mail-order or telephone-order, lost or stolen credit cards, and credit abuse. For each fraud type, there may exist a pattern in the account data that may be qualitatively and quantitatively defined by a set of fraud qualifiers and quantifiers. Table 1 lists some exemplary qualifiers and quantifiers for two fraud types: fraudulent application and account takeover (ATO). If the caller's account status matches a fraud qualifier, the account data may be further examined for the corresponding qualifiers. Once the account has been assessed for all the known fraud types, the assessment outcome may be displayed to the fraud analyst with the fraud type and matched qualifiers and quantifiers highlighted. The user interface shown in FIG. 5 also shows an exemplary fraud assessment outcome in area 504. In this example, the potential fraud type is identified as "Fraudulent Application," the matched qualifier is the account's "Open Date," and the matched quantifier is "Death SSN" (i.e., a death claim against the SSN used in the credit application). Thus, these items are highlighted on the screen for the fraud analyst's attention.

TABLE 1

| FRAUD TYPES | FRAUD QUALIFIERS | FRAUD QUANTIFIERS |
|---|---|---|
| Fraudulent Application | Account has been open for less than 6 months; OR Account has been open for more than 6 months but 120 days of delinquency. | Death claim against the Social Security Number (SSN) SSN out of range, or not yet issued SSN usage in the past 6 months Fraud alert on credit bureau Home address in a high risk zip There is an authorized user with different last name Address is on the negative file (zip and street name match) Bad ANI (automatic number identification), i.e., number is in a negative file, for home or business phone numbers: Activation ANI is bad Phone number on file is bad Telemarketing ANI is bad Number caller is calling from (Inbound) Request for convenience checks within 30 days of opening account Location of card activation/ PIN select is in: high risk area code and area code does not match phone numbers on account (Home or Business) high risk iiDigits (identification information digits) Phone number on file is in "Hot" area code |
| Account Takeover | Address or Phone change within past 60 | Credit card issue date within past 60 days |

TABLE 1-continued

| FRAUD TYPES | FRAUD QUALIFIERS | FRAUD QUANTIFIERS |
|---|---|---|
| (ATO) | days; OR Addition of Authorized User within past 60 days; OR Cards sent to alternate address within past 60 days; OR Balance Transfer within past 60 days | Change address to a high risk zip or zip on negative file Account currently in an ATO queue and not previously "cleared" from an ATO queue Bad ANI (home or business), i.e., number is on negative file Activation ANI is bad, i.e., number is on negative file Phone number on file is bad, i.e., number is on negative file Telemarketing ANI is bad, i.e., number is on negative file PIN selection date is within past 60 days Location of card activation/ PIN select is different from current home number on file High risk area code and area code does not match phone numbers on account (home or business) High risk iiDigits (identification information digits) Phone change to a "Hot" area code Credit card type is requested (new, reissue, etc.) |

Next, in step 210, the fraud analyst may be guided through a series of computer-generated verification steps. The series of computer-generated verification steps are also known as "workflows," some of which include "sub-workflows." Exemplary workflows and sub-workflows well be described in detail below. Each verification step may comprise one or more questions such that there may be a series of questions for which the fraud analyst may solicit responses from the caller. The caller's response to each question may be entered by the analyst into the computer program, and a subsequent question may be generated based on the responses to previous questions in the series.

In step 212, a decision on a fraud status may be made based on a computerized analysis of the caller's responses. The caller's answers to the series of questions, together with existing account data, may paint a more comprehensive picture of the account in question, thereby enabling a determination, in step 214, whether a fraud or credit abuse situation exists. If a fraud or credit abuse situation has been confirmed, then, in step 216, a fraud recovery pattern may be followed to dispose a related transaction or account. If it is confirmed that no fraud or credit abuse exists, then, in step 218, any fraud-related flags and/or restrictions on the account may be removed.

A fraud recovery pattern may include a list of possible fraud verification outcomes and the corresponding actions for a fraud analyst to take. For example, an automatic teller machine (ATM) charge to a credit account may be fraudulent if the transaction has a standard industrial classification (SIC) code of 6011—associated with federal reserve banks. The ATM charge may be identified by the computer system and presented to a fraud analyst. Based on the cardholder's responses to the fraud analyst's questions, a number of outcomes and actions may be possible. If it is verified that the cardholder has made ATM transactions from that location in the past yet does not remember making the transaction in question, there may be no actual fraud. The fraud analyst may determine that the cardholder may have thought he or she used an ATM card but actually used the credit card. Accordingly, the fraud alert on the credit account may be released. If it is verified that the cardholder has given permission to a known person in the past to use card and such person made the ATM transaction in question, there may be a familiar fraud for which the cardholder is held responsible. If it is verified that someone known to the cardholder had access to the credit card and the personal identification number (PIN), there may a familiar fraud for which the cardholder is held not responsible. The fraud analyst may educate the cardholder regarding security of PIN information. If it is verified that the cardholder never received the credit card and the PIN, an account takeover (ATO) may have occurred. The cardholder may be held not responsible and may verify his or her current mailing address in order to receive a new card.

In another example, a mail order or telephone order transaction may be potentially fraudulent when address verification service (AVS) indicates a correct shipping address yet the cardholder does not recognize the charge. A fraud analyst may call the cardholder to verify the transaction. If it is verified that the cardholder actually made the purchase but forgot about it, there may be no fraud. If it is verified that the cardholder gave permission to someone in the past to use the card, there may be a familiar fraud for which the cardholder is held responsible. If someone in the cardholder's household or someone who has access to the household had placed the order and received the merchandise without the cardholder's knowledge, there may be a familiar fraud for which the cardholder is not responsible.

If, however, the fraud status cannot be determined, a predetermined set of business rules may be invoked in step 220 to evaluate profitability and risk for the account. For example, a number of quantifiers may be employed to determine whether an account is profitable and whether there exists a significant risk of fraud loss for the account. Table 2 lists some exemplary quantifiers for an account with potential "fraudulent application" status and "account takeover" status. In Table 2, "NPV" stands for net present value. "Precard_score" is the cardholder's credit score before issuance of the current credit card. "ANI" stands for automatic number identification (similar to caller ID). A Falcon™ score is a computer-generated fraud score for real-time decisioning of payment card transactions. Then, in step 222, based on the profitability-risk evaluation, the system may recommend an action for the fraud analyst to take regarding the undetermined fraud status. In step 224, the fraud analyst may take the recommended action. Or the fraud analyst may use his or her own judgment and choose to override the computer-recommended action.

TABLE 2

| FRAUD TYPE | PROFITABILITY QUANTIFIERS | RISK QUANTIFIERS |
|---|---|---|
| Fraudulent Application | NPV > $500 | Precard_score > XXXX<br>Falcon score > 900<br>Death claim against SSN<br>SSN out of range, or not yet issued<br>Fraud alert on credit bureau<br>Address on the negative file (zip and street name match)<br>Home phone on file match to negative file<br>Recent Bad ANT call or activation VRU |
| Account Takeover | NPV > $500 | Falcon score > 900<br>Address change to a high risk SCF<br>Address change match address negative file<br>Home phone on file match to |

TABLE 2-continued

| FRAUD TYPE | PROFITABILITY QUANTIFIERS | RISK QUANTIFIERS |
|---|---|---|
| | | negative file<br>Recent Bad ANT call or activation VRU |

Figure 6:
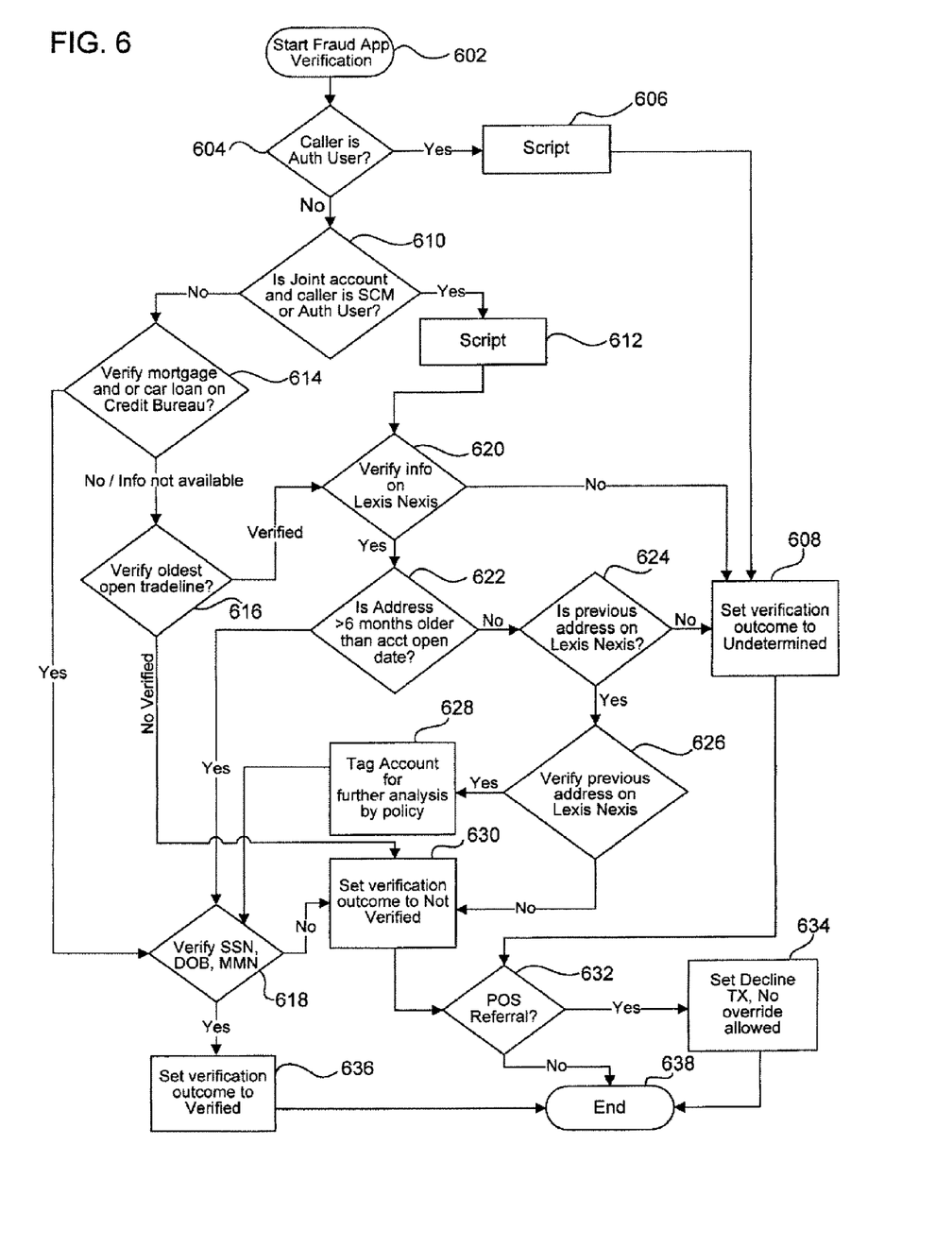
FIG. 6 is a flow chart illustrating an exemplary workflow for verifying a fraudulent application in accordance with an embodiment of the present invention.
Figure 7:
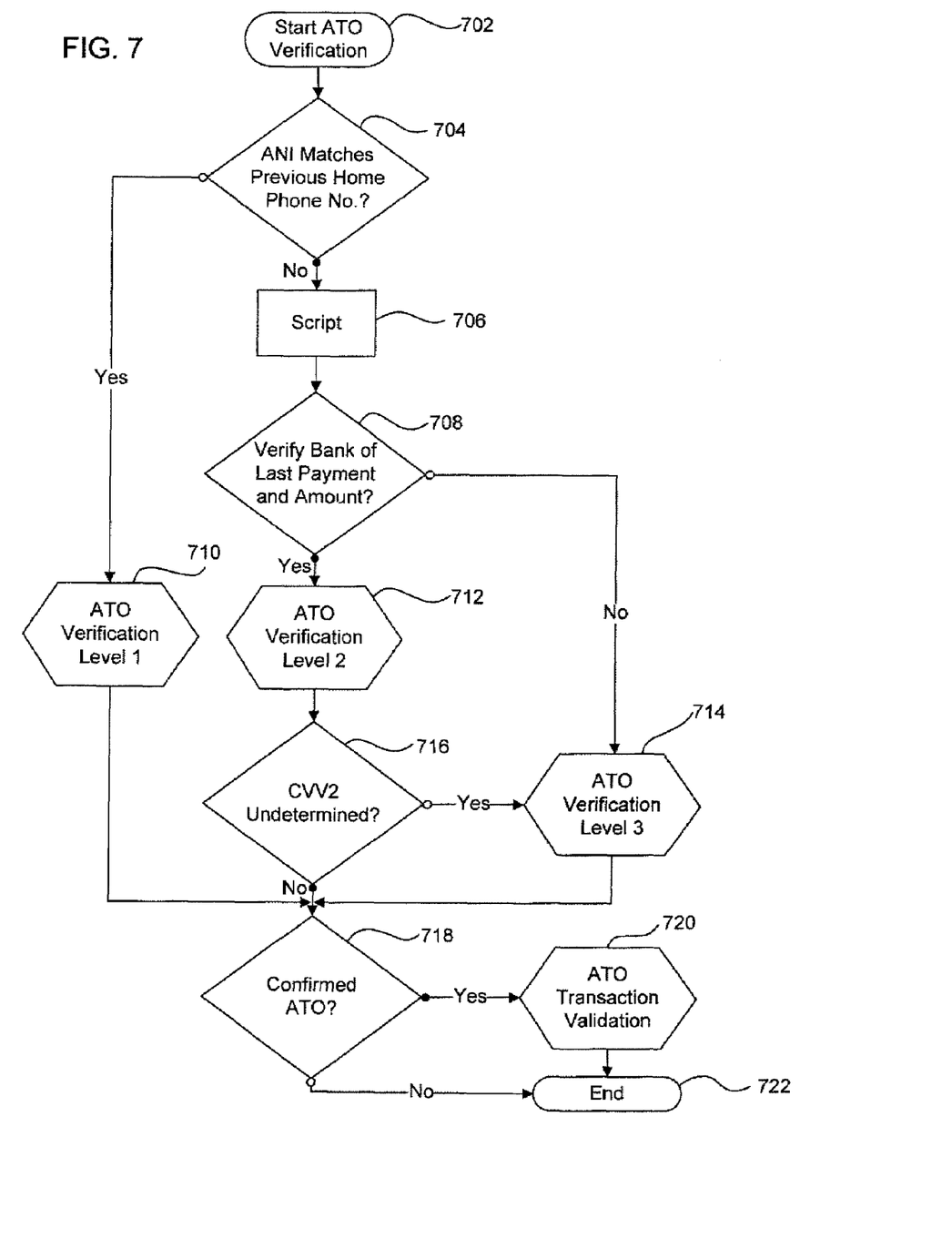
FIG. 7 is a flow chart illustrating an exemplary workflow for verifying an account takeover in accordance with an embodiment of the present invention.

For a better understanding of the embodiments of the present invention, two exemplary workflows, one for verifying "fraudulent application" and the other for verifying "account takeover," are illustrated in FIGS. 6 and 7 respectively. These workflows may typically occur in step 110 of the exemplary method shown in FIG. 1, or in step 210 of the exemplary method shown in FIG. 2.

Referring to FIG. 6, the "fraudulent application" verification workflow starts in step 602. In step 604, it may be determined whether the caller is an authorized user listed on the account in question. If the caller is not an authorized user, the workflow may branch to step 610. If the caller is an authorized user, a script may be displayed in step 606 to the fraud analyst. The script may comprise a computer-generated interpretation of the caller's response and may provide guidance for the fraud analyst to perform a subsequent task. In this case, the fraud analyst may be instructed to set the verification outcome to "Undetermined" in step 608.

In step 610, it may be determined whether the caller is a secondary card member (SCM) of a joint account. If so, a script may be played in step 612 to guide the fraud analyst to move on to step 620. If the caller is not a SCM of a joint account, then, in step 614, the caller may be asked to verify his or her mortgage or car loan information as listed on the credit bureau record. If the caller is able to verify the mortgage or car loan information, the workflow may branch to step 618. If the caller cannot verify the information or such information is not available from the credit bureau, the caller may be asked to verify his or her oldest open tradeline in step 616. If the caller cannot verify the tradeline information, the fraud analyst may set the verification outcome as "Not Verified" in step 630. If the caller provides the tradeline information, the information may be verified on LexisNexis® (or other informational databases) in step 620. If the tradeline information cannot be verified on LexisNexis®, the fraud analyst may set the verification outcome to be "Undetermined" in step 608.

If the tradeline information is verified on LexisNexis®, then, in step 622, it may be determined whether the caller has a current mailing or address that is more than six months old than the caller's account open date. If so, the workflow may branch to step 618. Otherwise, it may be determined, in step 624, whether a previous address for the caller is available on LexisNexis®. If not, the verification outcome may again to be set to "Undetermined" in step 608. If there is a previous address on LexisNexis®, the caller may be asked to verify the previous address. If the caller cannot provide an address that matches the previous address on LexisNexis®, the verification outcome may be set to "Not Verified" in step 630. If the caller can verify the previous address, then, in step 628, the account may be tagged for risk analysis and further analysis based on operational policy, and the workflow may branch to step 618.

In step 618, the caller may be asked to verify some security information, such as his or her social security number (SSN), date of birth (DOB), and mother's maiden name (MMN). If the caller successfully verifies all the security information, the fraud analyst may set the verification outcome to "Verified" in step 636 and the workflow may then end in step 638.

If the caller fails to verify all the security information, the verification outcome may again be set to "Not Verified" in step 630.

After the verification outcome is set to "Not Verified" (in step 630) or "Undetermined" (in step 608), it may be determined in step 632 whether the call is a point of sales (POS) referral. If it is a POS referral and there is a transaction pending, the system may set the transaction status to "Declined" and the fraud analyst will not be allowed to override the decision. The workflow will then end in step 638.

Referring to FIG. 7, the "account takeover" verification workflow starts in step 702. In step 704, it may be determined whether the automatic number identification (ANI) of the incoming telephone call matches the caller's home telephone number. If so, the workflow may enter an "ATO Verification-Level 1" sub-workflow in step 710. Otherwise, a script may be displayed to the fraud analyst, in step 706, to instruct the fraud analyst to perform additional verification. A portion of the script may be read to the caller, in step 708, to verify from which bank the last payment was made and the amount of the payment. If the caller is able to verify this last payment information, the workflow may enter an "ATO Verification-Level 2" sub-workflow in step 712. Otherwise, the workflow may enter an "ATO Verification-Level 3" sub-workflow in step 714. In the three sub-worflows (steps 710, 712, and 714), the caller may be subject to security verifications at different levels of detail. Of the three workflows, "ATO Verification-Level 1" may be the least detailed while "ATO Verification-Level 3" may be the most detailed.

After "ATO Verification-Level 1" (step 710) is completed, the workflow may continue to step 718. After "ATO Verification-Level 2" is completed, it may be decided, in step 716, whether the CVV2 number (a 3- or 4-digit security number printed on a credit card) is undetermined. If so, the work flow may enter the "ATO Verification-Level 3" sub-workflow in step 714. Otherwise, the workflow may branch to step 718. Upon completion of "ATO Verification-Level 3," the workflow also branches to step 718.

In step 718, it may be determined whether an account takeover situation has been confirmed from the above-mentioned "ATO Verification" sub-workflows. If an ATO has not been confirmed, the workflow may end in step 722. If an ATO is confirmed, the workflow may enter an "ATO Transaction Verification" sub-workflow in step 720, where the caller may be asked to verify potential ATO transactions posted to the account. Then workflow may end in step 722.

Figure 8:
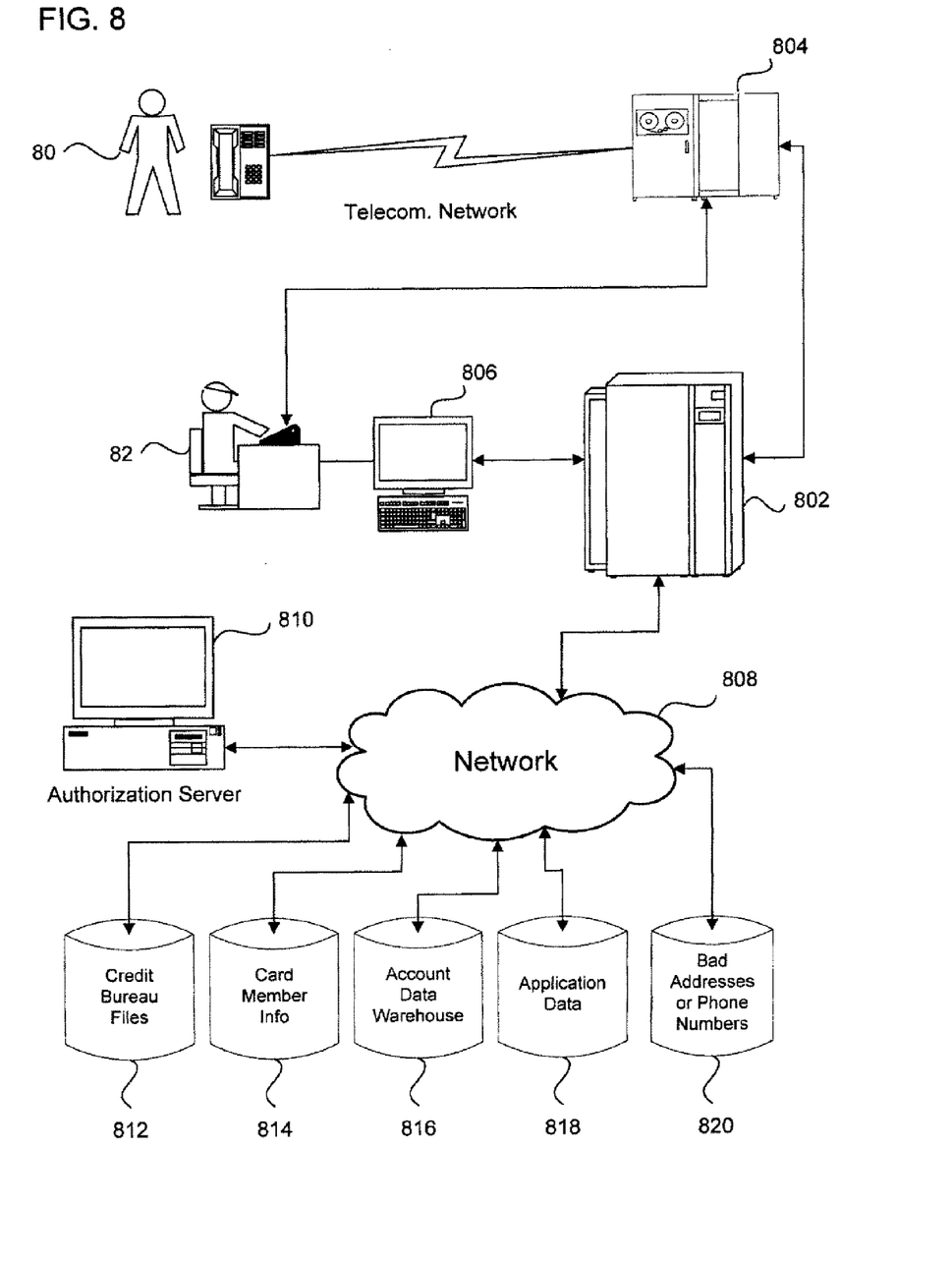
FIG. 8 is a block diagram illustrating an exemplary system for detecting and processing fraud and credit abuse in accordance with an embodiment of the present invention.

The method for detecting and processing fraud and credit abuse in accordance with the present invention may be typically implemented in a computer-based system. FIG. 8 is a block diagram illustrating an exemplary system for detecting and processing fraud and credit abuse according to an embodiment of the present invention. The exemplary system may comprise a central processor 802 (e.g., a mainframe computer) capable of data manipulation, logic operation and mathematical calculation. A suite of computer programs that implement embodiments of the present invention may be executed by the central processor 802. The system may also comprise a user interface 806 for access by a fraud analyst 82, for example. The processor 802 may be connected, via a network 808, to a number of databases, such as credit bureau files 812, card member information 814, an account data warehouse 816, a credit application database 818, and records of bad addresses and telephone numbers (820). The central processor 802 may also have real-time access to an authorization server 810 which processes credit card charges.

In operation, a caller 80 may place a telephone call to the card issuer's customer service center, for example. The call may be initially routed to a VRU device 804 located in a call center. The VRU device 804 may interact with the caller and receive information to identify the caller and to further route the call. The information may be forwarded to the central processor 802 so that it may perform fraud assessment based on data retrieved from the databases 812-820 and/or the authorization server 810. While the call has been routed to the fraud analyst 82, an initial fraud assessment outcome may be generated by the central processor 802 and displayed via the user interface 806. Based on the initial fraud assessment outcome, the central processor 802 may also generate a series of verification steps to guide the fraud analyst 82 as he converses with the caller. Responses from the caller may be entered via the user interface 806 so that they may be analyzed by the central processor 802 and subsequent inquiries or a fraud judgment may be generated. After a decision has been reached regarding a fraud status of the caller's account, the central processor 802 may further recommend and guide the analyst through disposition steps.

It should be noted that, although the exemplary embodiments described above are mostly directed to inbound scenarios (e.g., a customer calling card-issuer), embodiments of the present invention also apply to outbound scenarios. That is, a fraud analyst may also initiate an interactive communication (e.g., a telephone call, electronic mails, or instant messages) to reach a customer who may be either a potential fraudster or fraud victim. For example, if a particular transaction or credit account is flagged for potential fraud-related problems, it may be queued for one or more fraud analysts to conduct fraud verification. Cases may be queued based on their levels of urgency as well as skill levels of the fraud analyst. In each particular case, contact information may be provided for an assigned fraud analyst to initiate an communication with the customer. If the customer cannot be reached, a voicemail message may be left to instruct the customer to make an inbound call to the call center. If an interactive communication is established, the fraud analyst may be guided by computer-generated workflows to verify potential fraud or credit abuse in a similar fashion as described above.

Further, the system and method for detecting and processing fraud and credit abuse as described above should not be limited to credit cards or credit accounts. Embodiments of the present invention may be adapted to detect and process fraudulent or abusive activities in the use of other financial or non-financial instruments, such as stored value cards, debit cards, transaction cards (e.g., American Express™ cards), reward cards, and benefit cards (e.g., insurance cards and health plan IDs). In addition, embodiments of the present invention may be applied to the verification and cashing process for checks, including but not limited to personal checks, payroll checks, and convenient checks.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method for detecting and processing fraud and credit abuse, the method comprising:

receiving a telephone call from a caller concerning a credit account;

identifying one or more potential fraud-related problems by searching the credit account data for conditions that match one or more predetermined qualifiers and quantifiers;

presenting the caller with a series of questions and soliciting, from the caller, responses to the series of questions, wherein each question in the series is generated based on the one or more potential fraud-related problems and further based on the caller's responses to earlier questions in the series; and determining a fraud status associated with the credit account based on a computerized analysis of the solicited responses.

2. The method according to claim 1 further comprising:
determining, automatically, a fraud-related reason why the caller initiated the telephone call; and
generating the series of questions based at least in part on the fraud-related reason.

3. The method according to claim 1 further comprising:
determining the caller's state of mind; and
generating the series of questions based at least in part on the caller's state of mind.

4. The method according to claim 1 further comprising:
providing a strategy for disposing the credit account based on the fraud status and a predetermined fraud recovery pattern.

5. The method according to claim 1 further comprising:
invoking a set of predetermined business rules, if the fraud status is undetermined, to assess a profitability and a risk associated with the credit account in view of a potential fraud type; and
generating a recommendation for disposing the credit account based on the profitability-risk assessment.

6. The method according to claim 1 further comprising:
determining fraud status for a plurality of credit accounts; and
prioritizing an order of fraud recovery for the plurality of credit accounts based at least in part on a fraud amount and an estimated success rate for recovering the fraud amount for each of the plurality of credit accounts.

7. A method for detecting and processing fraud and credit abuse, the method comprising:
capturing transaction data associated with a credit account on a substantially real-time basis;
evaluating the captured transaction data against a plurality of fraud qualifiers and quantifiers; and
generating a fraud alert based on the evaluation, wherein the fraud alert comprises a potential fraud type and a recommended strategy for dealing with the potential fraud type.

8. The method according to claim 7 further comprising:
establishing an interactive communication with a customer associated with the credit account based on the recommended strategy;
presenting the customer with a series of questions and soliciting, from the customer, responses to the series of questions, wherein each question in the series is generated based on the potential fraud type and further based on the caller's responses to earlier questions in the series; and
determining a fraud status associated with the credit account based on a computerized analysis of the solicited responses.

9. The method according to claim 7 further comprising:
determining fraud status for a plurality of credit accounts;
prioritizing an order of fraud recovery for the plurality of credit accounts based at least in part on a fraud amount and an estimated success rate for recovering the fraud amount for each of the plurality of credit accounts; and
initiating communications with customers associated with the plurality of credit accounts based on the prioritized order.

10. A method for detecting and processing fraud and credit abuse, the method comprising:
establishing an interactive communication with a customer concerning a credit account;
identifying one or more potential fraud-related problems by searching the credit account data for conditions that match one or more predetermined qualifiers and quantifiers;
presenting the customer with a series of questions and soliciting, from the customer, responses to the series of questions, wherein each question in the series is generated based on the one or more potential fraud-related problems and further based the caller's responses to earlier questions in the series; and
determining a fraud status associated with the credit account based on a computerized analysis of the solicited responses.

11. A system for detecting and processing fraud and credit abuse, the system comprising:
means for receiving a telephone call from a caller concerning a credit account;
means for identifying one or more potential fraud-related problems by searching the credit account data for conditions that match one or more predetermined qualifiers and quantifiers;
means for presenting the caller with a series of questions and soliciting, from the caller, responses to the series of questions, wherein each question in the series is generated based on the one or more potential fraud-related problems and further based on the caller's responses to earlier questions in the series; and
means for determining a fraud status associated with the credit account based on a computerized analysis of the solicited responses.

12. The system according to claim 11 further comprising:
means for determining, automatically, a fraud-related reason why the caller initiated the telephone call; and
means for generating the series of questions based at least in part on the fraud-related reason.

13. The system according to claim 11 further comprising:
means for determining the caller's state of mind; and
means for generating the series of questions based at least in part on the caller's state of mind.

14. The system according to claim 11 further comprising:
means for providing a strategy for disposing the credit account based on the fraud status and a predetermined fraud recovery pattern.

15. The system according to claim 11 further comprising:
means for invoking a set of predetermined business rules, if the fraud status is undetermined, to assess a profitability and a risk associated with the credit account in view of a potential fraud type; and
means for generating a recommendation for disposing the credit account based on the profitability-risk assessment.

16. The system according to claim 11 further comprising:
means for determining fraud status for a plurality of credit accounts; and
means for prioritizing an order of fraud recovery for the plurality of credit accounts based at least in part on a fraud amount and an estimated success rate for recovering the fraud amount for each of the plurality of credit accounts.

17. A system for detecting and processing fraud and credit abuse, the system comprising:
   means for capturing transaction data associated with a credit account on a substantially real-time basis;
   means for evaluating the captured transaction data against a plurality of fraud qualifiers and quantifiers; and
   means for generating a fraud alert based on the evaluation, wherein the fraud alert comprises a potential fraud type and a recommended strategy for dealing with the potential fraud type.

18. The system according to claim 17 further comprising:
   means for establishing an interactive communication with a customer associated with the credit account based on the recommended strategy;
   means for presenting the customer with a series of questions and soliciting, from the customer, responses to the series of questions, wherein each question in the series is generated based on the potential fraud type and further based on the caller's responses to earlier questions in the series; and
   means for determining a fraud status associated with the credit account based on a computerized analysis of the solicited responses.

19. The system according to claim 17 further comprising:
   means for determining fraud status for a plurality of credit accounts;
   means for prioritizing an order of fraud recovery for the plurality of credit accounts based at least in part on a fraud amount and an estimated success rate for recovering the fraud amount for each of the plurality of credit accounts; and
   means for initiating communications with customers associated with the plurality of credit accounts based on the prioritized order.

20. A method for detecting and processing fraud and credit abuse, the method comprising:
   establishing an interactive communication with a customer concerning a credit account;
   identifying one or more potential fraud-related problems by searching the credit account data for conditions that match one or more predetermined qualifiers and quantifiers;
   presenting the customer with a series of questions and soliciting, from the customer, responses to the series of questions, wherein each question in the series is generated based on the one or more potential fraud-related problems and further based the caller's responses to earlier questions in the series;
   determining a fraud status associated with the credit account based on a computerized analysis of the solicited responses; and
   generating a strategy for disposing the credit account based on:
      the fraud status,
      a predetermined fraud recovery pattern,
      a profitability-risk assessment for the credit account, and
      an estimated success rate for fraud recovery.

21. A computer readable medium having code for causing a processor to detect and process fraud and credit abuse, the computer readable medium comprising:
   code adapted to receive a telephone call from a caller concerning a credit account;
   code adapted to identify one or more potential fraud-related problems by searching the credit account data for conditions that match one or more predetermined qualifiers and quantifiers;
   code adapted to present the caller with a series of questions and solicit, from the caller, responses to the series of questions, wherein each question in the series is generated based on the one or more potential fraud-related problems and further based on the caller's responses to earlier questions in the series; and
   code adapted to determine a fraud status associated with the credit account based on a computerized analysis of the solicited responses.

22. The computer readable medium according to claim 21 further comprising:
   code adapted to determine, automatically, a fraud-related reason why the caller initiated the telephone call; and
   code adapted to generate the series of questions based at least in part on the fraud-related reason.

23. The computer readable medium according to claim 21 further comprising:
   code adapted to determine the caller's state of mind; and
   code adapted to generate the series of questions based at least in part on the caller's state of mind.

24. The computer readable medium according to claim 21 further comprising:
   code adapted to provide a strategy for disposing the credit account based on the fraud status and a predetermined fraud recovery pattern.

25. The computer readable medium according to claim 21 further comprising:
   code adapted to invoke a set of predetermined business rules, if the fraud status is undetermined, to assess a profitability and a risk associated with the credit account in view of a potential fraud type; and
   code adapted to generate a recommendation for disposing the credit account based on the profitability-risk assessment.

26. The computer readable medium according to claim 21 further comprising:
   code adapted to determine fraud status for a plurality of credit accounts; and
   code adapted to prioritize an order of fraud recovery for the plurality of credit accounts based at least in part on a fraud amount and an estimated success rate for recovering the fraud amount for each of the plurality of credit accounts.

27. A computer readable medium having code for causing a processor to detect and process fraud and credit abuse, the computer readable medium comprising:
   code adapted to capture transaction data associated with a credit account on a substantially real-time basis;
   code adapted to evaluate the captured transaction data against a plurality of fraud qualifiers and quantifiers; and
   code adapted to generate a fraud alert based on the evaluation, wherein the fraud alert comprises a potential fraud type and a recommended strategy for dealing with the potential fraud type.

28. The computer readable medium according to claim 27 further comprising:
   code adapted to establish an interactive communication with a customer associated with the credit account based on the recommended strategy;
   code adapted to present the customer with a series of questions and solicit, from the customer, responses to the series of questions, wherein each question in the series is generated based on the potential fraud type and further based on the caller's responses to earlier questions in the series; and code adapted to determine a fraud status associated with the credit account based on a computerized analysis of the solicited responses.

29. The computer readable medium according to claim 27 further comprising:

code adapted to determine fraud status for a plurality of credit accounts;

code adapted to prioritize an order of fraud recovery for the plurality of credit accounts based at least in part on a fraud amount and an estimated success rate for recovering the fraud amount for each of the plurality of credit accounts; and code adapted to initiate communications with customers associated with the plurality of credit accounts based on the prioritized order.

* * * * *